Feb. 25, 1930.  E. L. GREENSFELDER  1,748,837
DEVICE FOR VIEWING OBJECTS ABOVE AND AHEAD OF AUTOMOBILES
Filed July 14, 1927
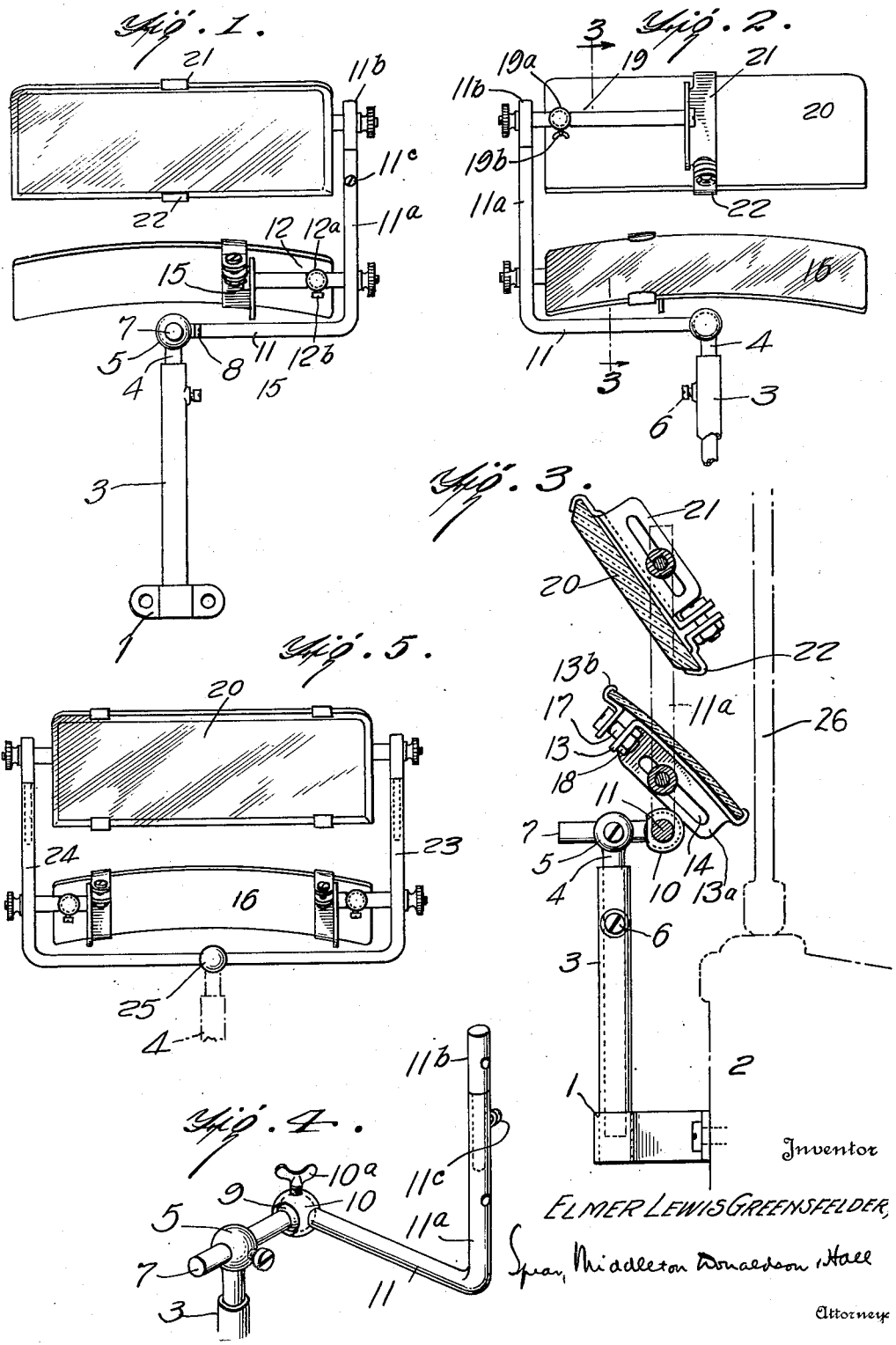
Inventor
ELMER LEWIS GREENSFELDER,
Spear, Middleton Donaldson & Hall
Attorneys Patented Feb. 25, 1930

1,748,837

UNITED STATES PATENT OFFICE

ELMER LEWIS GREENSFELDER, OF BALTIMORE, MARYLAND

DEVICE FOR VIEWING OBJECTS ABOVE AND AHEAD OF AUTOMOBILES

Application filed July 14, 1927. Serial No. 205,611.

My present invention relates to a device for assisting a motorist to observe objects ahead and above the automobile which he is driving, such as traffic lights commonly hung above a street intersection or to one side thereof.

It is common knowledge that very often a motorist stops his automobile so close to the intersection when a traffic light is at the stop position, that he is unable to see the light itself without inconvenience due to the fact that the light is obscured by the automobile top, roof or sun visor. This invention therefore contemplates a device which will make such lights visible to a driver when stopped in such a position.

Another object of the invention is the provision of a series of mirrors, adjustable in all necessary directions together with a carrying frame and holding parts for attachment to an automobile which will accomplish the above result, which will be as nearly universal for all cars as possible, which will be of a simple construction and therefore cheap to manufacture, and which will be of such a size and placed in such a position that the driver's vision will not be obscured.

To this end the invention contemplates the provision of a frame for attachment to an automobile dash or instrument board, which frame carries two adjustable mirrors. It is preferable that the view receiving mirror be of a convex nature in order to receive a maximum vista, although a plane surface mirror may be used. This view is then reflected into a plane surface mirror which I shall term a view transmitting mirror, from which it passes to the motorist's or driver's eyes. In order to get efficient results and make the device as universal as possible, it is desirable that the mirrors be adjustable in all directions and likewise the frame carrying the same. This will enable the view receiving mirror to catch objects such as a traffic light ahead and above the vehicle and reflect the same to the view transmitting mirror where it is seen by the driver, even though the object such as the traffic light is hidden to him from a direct view.

The invention further consists in the novel arrangement, combination and construction of parts hereinafter shown and described.

In the drawings:—

Fig. 1 is a front view of a device embodying my invention.

Fig. 2 is a rear view of Fig. 1.

Fig. 3 is a sectional elevation along the line 3—3 of Fig. 2.

Fig. 4 is a detail of the frame and associated parts.

Fig. 5 is a front view of a modified form.

Referring to the embodiment illustrated, I have shown at 1 a bracket adapted to be secured to an automobile as on the instrument board 2, which bracket includes a supporting tube 3 and, its complementary telescopic extension member 4. Member 4 is provided with an enlarged head 5 which limits downward movement into the tube 3. A set screw 6 may be used to lock the extension member 4 into any desired relation with tube 3.

Carried in the enlarged head 5 is a short arm 7 movable therethrough in a direction at right angles to the axis of the tube 3. A set screw 8 permits the adjustment to be locked. The arm 7 terminates in a ball element 9 adapted to be received in a socket 10 on the supporting frame 11, so that universal movement may be had between frame 11 and arm 7. Friction between socket 10 and ball 9 prevents undue movement between these parts, but at the same time permits adjustment when desired. A set screw $10^a$ may be used to lock the parts.

The frame 11 is provided with a substantially vertical portion $11^a$ which receives a telecopic member $11^b$ to which is secured a carrying post 12 on the end of which is secured an adjustable bracket 13. A set screw $11^c$ permits the vertical adjustment to be locked. This bracket comprises a main portion $13^a$ slotted as at 14 to receive the shank of an adjusting screw 15 which may be tightened against the carrying post 12. A complementary portion $13^b$ is provided and between this part and the part $13^a$, a convex mirror 16 is gripped. Due to the provision of bolt 17 and nut 18 various sized mirrors may be utilized. A universal joint $12^a$ in the carrying post locked by set screw 12^b permits further mirror adjustment.

Above the convex view receiving mirror 16 and upon a similar carrying post 19, universally jointed as at 19^a and locked by set screw 19^b, a view transmitting mirror 20 is provided, having the same adjustable gripping complementary parts 21 and 22. The mirror 20 is preferably a plane surface mirror and is so arranged that its reflecting face lies toward the face of the convex mirror 16.

In practice, the entire device is preferably attached to the automobile so that the lower mirror is just above the lower edge of the windshield glass 26 and close thereto. In this position, the device is ordinarily below the normal vision of an automobile driver so as not to obstruct his vision ahead.

By manipulating the set screw 6 the proper vertical adjustment may be had, and by backing off the set screw 8, the frame and its mirrors may be moved in substantially a horizontal direction up to the windshield so as to be in proper position for efficient operation.

The ball and socket joint at the end of the short arm 7 permits proper angular adjustment of the entire frame.

Each driver will be able because of the universal adjustability of each mirror to set the mirrors so that the object or vista sought to be caught by the view receiving mirror will be caught and viewed by the driver in the second or view transmitting mirror without the necessity of moving from his position as would be the case without this device.

As an alternative construction I may provide the frame as a U-shaped member, having arms 23 and 24, the lower center portion of the U being attached to the short arm 7 as by universal joint 25. In this form, the mirrors 16 and 20 are held at each end in the manner as above described and individually rotatable between the respective arms of the U frame. Such a construction, prevents undue vibration of the mirrors yet allows adjustment longitudinally, laterally and rotatively to bring the proper vista into view.

It will be noted that in the construction shown a very compact and efficient device has been provided which because of its universal adjustments is capable of use with a large number of makes of automobiles, yet maintaining a simplicity of construction.

Obviously, either mirror may be interchanged, or replaced by other types such as concave, although most efficient results are obtained by the use of those shown.

What is claimed is:

A device for viewing objects above and ahead of an automobile comprising a telescopic vertically adjustable bracket, said bracket having a horizontally adjustable rod in its upper end, a frame having a horizontal portion with a vertical portion extending upward from the end of the horizontal portion, a universal joint connection between said horizontal portion of the frame and one end of the horizontally adjustable rod, the vertical portion of the frame receiving at its upper end a telescopic member for vertical adjustment, a horizontal carrying post on the vertical frame portion and a second horizontal carrying post above and in vertical alignment therewith and secured to the telescopic member, a mirror carrying clamp attached to each post for rotary adjustment about the horizontal axis of each post, a mirror secured in each mirror carrying clamp, said horizontal carrying posts each being provided with a universal joint between the mirror carrying clamp and the vertical portion of the frame, and means to secure the bracket to the instrument board of the automobile.

In testimony whereof I affix my signature.

ELMER LEWIS GREENSFELDER.